United States Patent [19]

Gillies

[11] Patent Number: 4,862,455

[45] Date of Patent: Aug. 29, 1989

[54] DEMULTIPLEXING CIRCUIT FOR A MULTIPLEX SIGNAL

[75] Inventor: David Gillies, Strasbourg, France

[73] Assignee: Deutsche ITT Industries GmbH, Freiburg, Fed. Rep. of Germany

[21] Appl. No.: 274,154

[22] Filed: Nov. 21, 1988

[30] Foreign Application Priority Data

Nov. 24, 1987 [EP] European Pat. Off. ......... 87117254.0

[51] Int. Cl.$^4$ ............................................... H04J 3/02
[52] U.S. Cl. ..................................................... 370/112
[58] Field of Search ................ 370/112; 328/104, 105; 307/243, 244; 364/759, 768

[56] References Cited

U.S. PATENT DOCUMENTS 3,302,008 1/1967 Mitchell ............................... 364/759
4,381,550 4/1983 Baker ................................... 364/766
4,797,852 1/1989 Nanda ................................... 370/112

Primary Examiner—Douglas W. Olms
Assistant Examiner—Min Jung
Attorney, Agent, or Firm—Thomas L. Peterson

[57] ABSTRACT

This demultiplexing circuit serves to "decode" a multiplex signal (m) formed by the formula $m = ns_1 + s_2$ from two digital signals ($s_1$, $s_2$) which are so redundant as to each represent an analog signal by only n amplitude levels instead of $2^p$ maximum possible levels, where p is the respective number of bits in the digital signals, and n satisfies the relation: $2\log_2 n$ is less than or equal to $2p - 1$. The circuit includes an iterative array of cells each comprising an adder, a switch, and two delay elements. The output of the final stage of the iterative array provides the second digital signal. By means of inverters and shift registers, the first digital signal is derived from the carry signals of the adders.

1 Claim, 1 Drawing Sheet

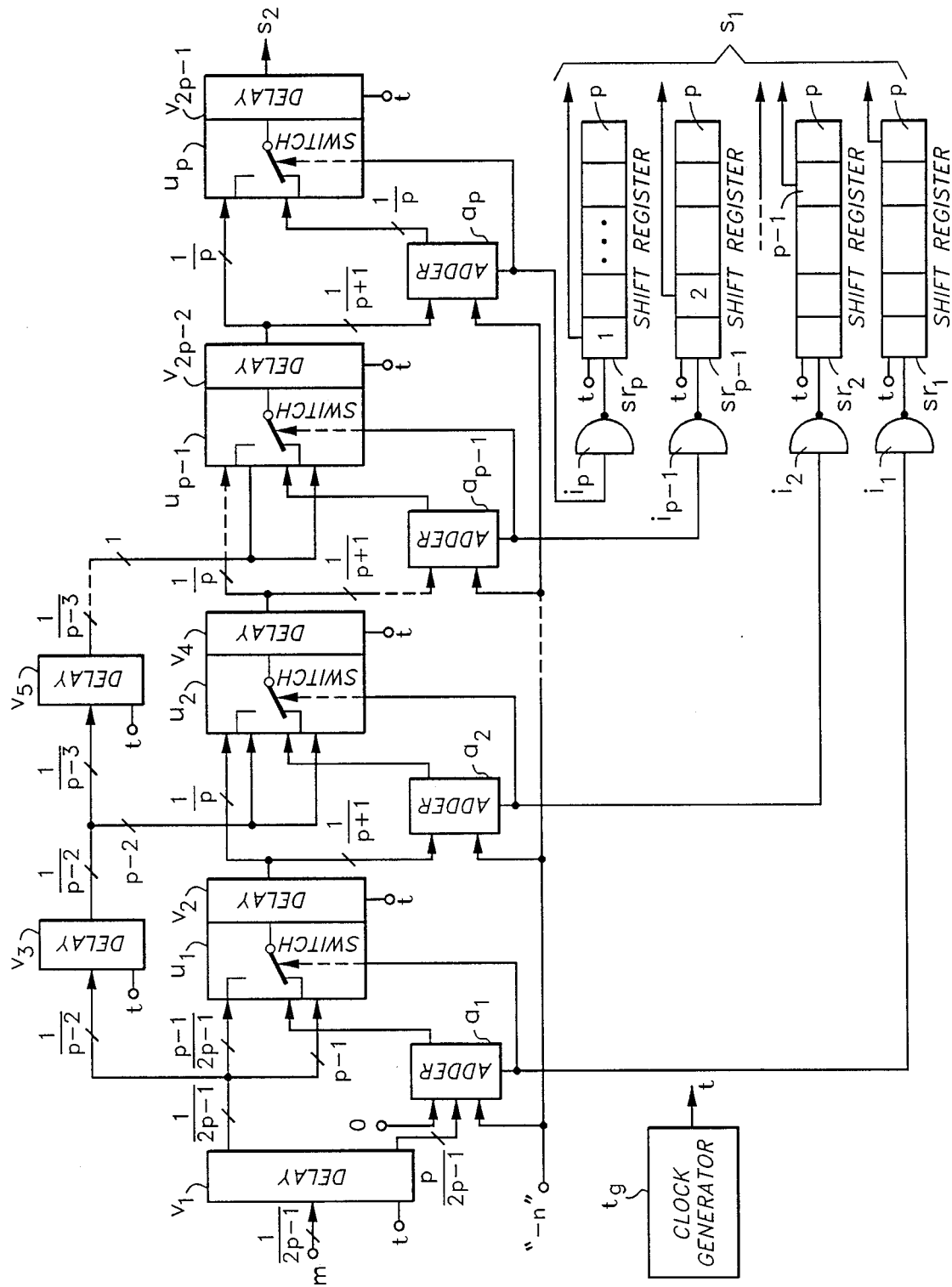

DEMULTIPLEXING CIRCUIT FOR A MULTIPLEX SIGNAL

FIELD OF THE INVENTION

The present invention is in the field of digital signal transmission and reception, and, in particular, in the field of transmission and reception of multiplexed digital signals wherein a transmitted and received digital signal comprises information from more than one signal source.

DESCRIPTION OF THE RELATED ART

The present invention relates to a demultiplexing circuit for a multiplex signal whose pulses occur at the pulse repetition rate of a clock signal. The multiplex signal is formed from a first digital signal and a second digital signal which are present in the straight binary code. The first and second digital signals and are so redundant as to each represent an analog signal by only n amplitude levels instead of 2p maximum possible amplitude levels, where p is the respective number of bits in the digital signal, and n satisfies the relation: $2 \log_2 n$ less than or equal to $2p-1$. The multiplex signal m is formed according to the formula: $m = ns_1 + s_2$, where $s_1$ is the value of the first digital signal and $s_2$ is the value of the second digital signal. Thus, the first digital signal $s_1$ is multiplied by the value n and added to the second digital signal $s_2$ to obtain the multiplex signal m.

The law of the formation of the multiplex signal from the two digital signals is explained in the Tagungsband, Teil 2, über die 12. Jahrestagung der FKTG (=Fernsehund Kinotechnische Gesellschaft) (Proceedings, Part 2, of the 12th Annual Meeting of the FKTG), compiled by G. Drechsler, Mainz, June 2 through 6, 1986, on pages 706 to 716, and, particularly on page 714. By forming the multiplex signal as described therein, one bit can be saved in the multiplex signal in comparison with the simple juxtaposition of the bits of the two digital signals. If, for example, the digital signals are five-bit signals (i.e., $p=5$), but only $n=22$ amplitude levels are represented by them, the multiplex signal has only 9 bits instead of 10, thus satisfying the relation $2 \log_2 22$ (i.e., 8.92) less than or equal to $(2 \times 5) - 1$ (i.e., 9). If this nine-bit multiplex signal is to be stored, less storage space is required than for a ten-bit multiplex signal.

Because of the above law, the multiplex signal can be produced from the two digital signals by a constant multiplier followed by an adder. As is stated on page 715 of the above reference, demultiplexing takes place according to the corresponding reciprocal law $m/n = s_1 + s_2/n$, which can be implemented with a divider, a multiplier for forming the reciprocal of n, and an adder. Since, for reasons of accuracy, this multiplier must have considerably more bits (for example, in the above numerical example, 16 bits are necessary), and thus requires so much area on an integrated-circuit chip that the above-mentioned gain in storage space is cancelled.

SUMMARY OF THE INVENTION

Accordingly, the object of the present invention is to provide a demultiplexing circuit for the above-described multiplex signals which, if implemented as a monolithic integrated circuit, takes up less chip area than that required with the above-mentioned multiplier, etc.

The p adders in the invention are only $(p+1)$-bit adders, and the amount of area occupied by them is essentially equal to that of a $(p+2)$-bit adder, which is already considerably less than with the above-mentioned multiplier. The invention includes $2p-1$ delay elements, of which 1 is a $(2p-1)$-bit element, $p-1$ are $(p+1)$-bit elements, and one is a p-bit element. The first of the remaining $p-2$ elements is a $(p-2)$-bit element, while each of the further elements has one bit less than the preceding one. This, too, results in a saving in area on the integrated-circuit chip, to which $p-1$ $(p+1)$-bit switches and a p-bit switch contribute as well. The invention further includes p inverters and p p-stage shift registers, each of which comprises so little area that the demultiplexing circuit according to the invention requires much less area than the above-mentioned demultiplexer using the multiplexer, etc. Thus, the present invention is preferred to the known above-mentioned demultiplexer. When the circuit is realized using CMOS technology, for example, the saving in area over the known demultiplexer ranges between 25% and 50%.

BRIEF DESCRIPTION OF THE DRAWING FIGURE

The invention will now be explained in greater detail with reference to the sole FIGURE of the accompanying drawing, which is a schematic circuit diagram of an embodiment of the invention.

DETAILED DESCRIPTION OF A PREFERRED EMBODIMENT

In the drawing FIGURE, in order to show which and how many bits of a signal are transferred over the respective connecting lines, the latter are provided with an oblique stroke (to indicate that they are generally buses). If the line has more than one conductor, the oblique stroke has a fraction associated with it. The numerator of the fraction specifies the least significant bit of the signal transferred over the line, and the denominator specifies the most significant bit. Thus, the number of bits in the signal can be determined by subtracting the numerator from the denominator and adding 1. For example, the fraction $$\frac{p-1}{2p-1}$$

represents the p bits $2p-1$, $2p-2$, ... p, $p-1$. If a line has only one conductor, the number of the bit transferred over this line is written next to the oblique stroke.

The multiplex signal m, which, as was mentioned above, has $2p-1$ bits in accordance with the law of its formation, is applied to the input of a first delay element $v_1$, which is thus a $(2p-1)$-bit element. The first delay element $v_1$ provides $2p-1$ output bits. The p most significant bits of the output of the first delay element $v_1$ are connected to the p least significant bits of the first input of a first adder $a_1$. The $(p+1)$st (most significant bit) of the first input of the first adder $a_1$ has a zero connected thereto. In other words, the output bits from the first delay element $v_1$ with the weights $2^{2p-1}$ to $2^{p-1}$ are applied to the first input of the first adder $a_1$. In the above example, in which $p=5$ (i.e., the multiplex signal m is a nine-bit signal), the bits applied to the first adder $a_1$ are thus the ninth to the fifth bit with the weights $2^8$ to $2^4$.

The $p+1$ most significant bits of the output of the delay element $v_1$ (i.e., the bits with the weights $2^{2p-2}$ to $2^{p-2}$), are connected to the first input of the first switch $u_1$. In the present example with p=5, these are thus the ninth to the fourth bit with the weights $2^8$ to $2^3$.

A first (p+1)-bit switch $u_1$ has a first input, a second input and a control input. The bits of the sum output of the first adder $a_1$, except for the sign bit, are connected to the p most significant bits of the second input of the switch $u_1$. The control input of the first switch $u_1$ is connected to the carry output of the first adder $a_1$. The least significant bit of the first input of the first switch $u_1$ and the least significant bit of the second input of the first switch $u_1$ are connected together and are connected to (p−1) st output of the first delay element $v_1$. In the example with p=5, the fourth bit of the output of the first delay element $v_1$ and, thus, the fourth bit of the multiplex signal m, is connected to the least significant bit of each of the two inputs. This fourth bit has the weight $2^3$. The position of the first switch $u_1$ and those of the other switches to be described below are shown in the FIGURE for the case where the carry output of the first adder $a_1$ or the carry outputs of the other adders are zero, (i.e., at the more negative level, the L level, of the two binary-signal levels H, L).

The output of the first switch $u_1$ is followed by the second delay element $v_2$. The p−2 least significant bits of the output of the first delay element $v_1$ are fed to the input of a third delay element $v_3$. These bits have the weights $2^{p-3}$ to $2^0$. Accordingly, the third delay element $v_3$ is a (p=2)-bit element.

As the FIGURE shows, the demultiplexing circuit according to the invention contains an iterative array, of which one "cell" and its "prestage" have been described so far. The first "cell" $z_1$ comprises the first adder $a_1$, the first switch $u_1$, the second delay element $v_2$, and the third delay element $v_3$; while the "prestage" comprises the first delay element $v_1$. The iterative array comprises p-1 cells $z_1, z_2, \ldots z_{p-1}$.

The first cell $z_1$ is followed by the second cell $z_2$. The second cell $z_2$ comprises a second adder $a_2$, a second switch $u_2$, a fourth delay element $v_4$ and a fifth delay elements $v_5$. All bits of the output of the second delay element $v_2$ are connected to the first input of the second adder $a_2$. The p least significant bits of the second delay element $v_2$ are connected to the p most significant bits of the first input of the second switch $u_2$. All bits of the sum output of the adder $a_2$, except the sign bit, are connected to the p most significant bits of the second input of the second switch $u_2$. The control input of the second switch $u_2$ is connected to the carry output of the second adder $a_2$. The least significant bits of the two inputs of the second switch $u_2$ are connected together and are connected to the most significant bit of the output of the third delay element $v_3$. This most significant bit output of the third delay element $v_3$ is thus the (p−2)nd bit of the multiplex signal m, (i.e., the third bit with the weight $2^2$ of the multiplex signal in the example with p=5). The p−3 least significant bits of the output of the third delay element $v_3$ are connected to the input of a fifth delay element $v_5$. (In the example where p=5, the first and second bits of the third delay element $v_3$ are thus connected to the input of the fifth delay element $v_5$.) Accordingly, the delay element $v_5$ is only a (p-3)-bit element.

Because of the arbitrary number of cells $z_1, z_2, \ldots$, in the drawing, a set of broken connecting lines are used to indicate that the scheme illustrated with the aid of the cells $z_1, z_2$ is correspondingly continued to the last cell shown, $z_{p-1}$. This last cell $z_{p-1}$ comprises an adder $a_{p-1}$, a switch $u_{p-1}$, and a delay element $v_{2p-2}$. It should be noted that a delay element corresponding to the delay element $v_3$ of the first cell $z_1$ and the delay element $v_5$ of the second cell $z_2$ is not present in the cell $z_{p-1}$. The last of the delay elements corresponding to the $v_3$ and the 5 delay elements, the (2p−3)rd delay element, is contained in the cell preceding the cell $z_{p-1}$. This preceding cell is not shown and would bear the reference characters $z_{p-2}$.

The first input of the (p−1)st adder $a_{p-1}$ is connected to the output of the preceding, (2p−4)th delay element (not shown) of the preceding cell. The p least significant bits of the output of the (2p−4)th delay element are connected to the p most significant bits of the first input of the (p−1)st switch $u_{p-1}$. With respect to the sum output of the adder $a_{p-1}$, all bits, except the sign bit, are connected to the p most significant bits of the second input of the switch $u_{p-1}$. The control input of the switch $u_{p-1}$ is connected to the carry output of the adder $a_{p-1}$. The least significant bit of each of the two inputs of the switch $u_{p-1}$ is connected to the output of the above-mentioned (2p−3)rd delay element of the preceding cell, which is not shown in the FIGURE. This bit is the least significant bit of the multiplex signal m.

In the iterative array, the cells $z_{p-1}$ is followed by the "final stage," comprising a pth adder $a_p$, a pth switch $u_p$, and a (2p−1)st delay element $v_{2p-1}$. The (2p−1)st delay element $v_{2p-1}$ is the last of the delay element and follows the switch $u_p$. The output of the delay element $v_{2p-1}$ provides the second digital signal $s_2$.

All output bits of the delay element $v_{2p=2}$ are connected to the first input of the adder $a_p$. All bits but the sign bit of the delay element $v_{2p-2}$ are connected to the p-bit first input of the switch $u_p$. The sum output of the adder $a_p$ is connected to the p-bit second input of the switch up. The control input of the switch $u_p$ is connected to the carry output of the adder $a_p$.

The second inputs of all adders $a_1, \ldots a_p$ are fed with the binary word corresponding to the negative value of n, i.e., "−n." Thus, if n is constant in a concrete demultiplexing circuit, the adders can be implemented as constant adders. Preferably, −n is fed to the adders in two's complement representation.

The delay provided by each of the delay elements $v_1, \ldots v_{2p-1}$ is equal to the period of a clock signal t delivered by a schematically shown clock generator tg, which, as is usual in large digital systems, feeds, clocks, and/or synchronizes the clocked subcircuits.

The first digital signal $s_1$ is formed from the carry signals of the adders $a_1, \ldots a_p$. To this end, each of the carry signals is applied to one of p inverters $i_1, \ldots i_p$. The outputs of the inverters $i_1, \ldots i_p$ are each coupled to the inputs of one of p p-stage shift registers $sr_1, \ldots sr_p$, having a common shift signal which is the clock signal t. The individual bits of the first digital signal $s_1$ can each be taken from one stage of one of the shift registers $sr_1, \ldots sr_p$, namely the bit with the weight $2^{p-1}$ from the pth stage p of the first shift register $sr_1$, the bit with the weight $2^{p-2}$ from the (p−1)st stage of the second shift register $sr_2$, and so on, such that the bit with the weight $2^1$ is taken from the second stage of the (p−1)st shift register $sr_{p-1}$, and the bit with the weight $2^0$ is taken from the first stage 1 of the pth shift register $sr_p$.

The operation of the invention will now be explained with the aid of a concrete numerical example, concrete values of the digital signals $s_1, s_2$, and the resulting value of the multiplex signal m. It will be assumed that $n=22$ and $p=5$, i.e., that two analog signals are digitized by means of only 22 amplitude levels each. Let the two digital signals have the values:

$s_1=01001$ (=decimal 9)
$s_2=01101$ (=decimal 13)

The multiplex signal is then:
$m=011010011$ (=decimal $211=(22\times 9)+13$).

With decimal $22=$ binary 10110, $-n$ in the two's complement is:

$-n=101010$ (the most significant bit, i.e., the left-hand 1, is the sign bit).

Applying the reciprocal formation law:

$$m/n=s_1+s_2/n,$$

yields $$m/n=\text{decimal } 211/22=9.590909\ldots$$

The number on the left of the point is already $s_1$. The part on the right of the point, i.e., decimal $0.590909\ldots$, must still be multiplied by n to obtain $s_2$:

$$s_2=0.590909\ldots \times 22=12.99\ldots=13$$

The same result is obtained by "direct" division and determining the remainder:

$$211/22=9 \text{ with a remainder of } 13$$

Thus,
$$9=s_1 \text{ and } 13=s_2$$

The demultiplexing circuit of the invention and its operation are based on this "direct" division. The individual steps are as follows:

1. Cell $z_1$:
0011010011: (Fifth to ninth bit of m as addend of $a_1$, a zero in the most significant bit)
101010: (Addition of $-n$ to $a_1$)
110111: (Sixth bit$=1$, inverted by $i_1$, gives the fifth bit$=0$ of $s_1$)

2. Cell $z_2$:
011010: (Because of carry from $a_1=1$, $u_1$ selects the 6 most significant bits of m as addend of $a_2$)
101010: (Addition of $-n$ is $a_2$)
1000100: (Sixth bit$=$carry$=0$, inverted by $i_2$, gives the fourth bit$=1$ of $s_1$)

3. Cell "$z_3$" (Not present in the FIGURE):
001000: (Because of carry from $a_2=0$, $u_2$ selects as the addend of "$a_3$" the five least significant bits (without the sign bit) of the output of $a_2$, with the fifth bit of m as the least significant bit)
101010: (Addition of $-n$ in "$a_3$")
110010: (Sixth bit=carry=1, inverted by a "$i_3$" gives the third bit$=0$ of $s_1$)

4. Cell "$z_4$" (Equal to cell $z_{p-1}$ in the FIGURE):
010001: (Because of carry from "$a_3$"$=1$, "$u_3$" selects as the addend of "$a_4$" the five least significant bits, without the sign bit, of the output of $u_2$ (these are the five least significant bits 01000 of the signal 001000, formed from the output of $a_2$ ($=001000$) and the third bit of m ($=0$), with the second bit ($=1$) of m as the least significant bit)
101010: (Addition of $-n$ in "$a_4$")
111011: (Sixth bit$=$carry$=1$, inverted by "$i_4$," gives the second bits$=0$ of $s_1$)

5. Final stage:
100011: (Because of carry from "$a_4$"$=1$, "$u_4$" selects as the addened of "$a_5$" ($=a_p$) the five least significant bits, without the sign bit, of the output of "$u_3$" (these are the five least significant bits 10001 of the addend of "$a_4$" (see under 4. above), with the firs bit ($=1$) of m as the least significant bit)
101010: (Addition of $-n$ in "$a_5$")
1001101: (Sixth bit$=$carry$=0$, inverted by "$i_5$" ($=i_p$), gives the first bit$=1$ of $s_1$. $s_1$ is thus 01001. Because of the carry from "$a_5$"$=0$, "$u_5$" selects the five least significant bits of the output of "$a_5$" as the digital signal $s_2=01101$)

Thus, the values of $s_1$, $s_2$ assumed for the formation of the exemplary value of m have been recovered.

The demultiplexing circuit according to the invention is preferably realized using integrated-circuit techniques, particularly MOS technology. It can be part of a larger integrated circuit, but it can also be implemented as a separate integrated circuit.

What is claimed is:

1. A demultiplexing circuit for a multiplex signal (m) whose pulses occur at the pulse repetition rate of a clock signal, and which is formed from a first digital signal ($s_1$) having p bits and a second digital signal ($s_2$) having p bits, said first and second digital signals being present in the straight binary code and being sufficiently redundant as to each represent an analog signal by only n amplitude levels instead of $2^p$ maximum possible amplitude levels, where n satisfies the relation: $2 \log_2 n$ less than or equal to $2_{p-1}$, and where said multiplex signal m comprises $2p-1$ bits that are the digital sum of the first and second digital signals corresponding to the formula $m=ns_1+s_2$, said demultiplexing circuit providing a demultiplexed first digital output signal and a demultiplexed second digital output signal in response to said multiplexed input signal and a binary digital input word having a value of $-n$ corresponding to the negative value of n, said demultiplexing circuit comprising:

a first delay element that receives the $(2p-1)$-bit multiplex signal and provides a first delayed output signal having $2p-1$ bits;

a first iterative stage comprising:

a first $(p+1)$-bit adder having a first input, a second input, a sum output and a carry output, the p least significant bits of the first input of said first adder being connected to the p most significant bits of the first delayed output of the first delay element, the $(p+1)$st most significant bit of said first input having a logical zero connected thereto, the second input of said first adder being connected to receive said binary word $-n$;

a first $(p+1)$-bit switch having a first input, a second input, a control input and an output, said first input being connected to receive the $p+1$ most significant bits of the output of the first delay element, and the p most significant bits of the second input of said first switch being connected to receive the unsigned sum output of the first adder, the least significant bit of the second input of said first switch being connected to the least significant bit of the first input of said switch to thereby receive the $(p-1)$st bit of the first delayed output of said first delay element, the control input of said first switch being connected to the carry output of said first adder;

a second delay element having an input and an output, said input connected to receive the output of said first switch, said output providing a second delayed output signal; and a third delay element having an input and an output, said input connected to receive the p−2 least significant bits of the first delayed output of said first delay element, said output providing a third delayed output signal;

a second iterative stage comprising:

a second (p+1)-bit adder having a first input, a second input, a sum output and a carry output, the first input of said second adder being connected to receive the second delayed output of said second delay element, the second input of said second adder being connected to receive said binary word −n;

a second (p+1)-bit switch having a first input, a second input, a control input and an output, the p most significant bits of the first input being connected to receive the p most significant bits of the output of the second delay element, the p most significant bits of the second input of said second switch being connected to receive the unsigned sum output of the second adder, the control input of said second switch being connected to receive the carry output of of said second adder, the least significant bit of each of the first and second inputs of said second switch being connected to receive the most significant bit of the third delayed output of said third delay element;

a forth delay element having an input and an output, the input of said fourth delay element being connected to receive the output of said second switch, the output of said fourth delay element providing a fourth delayed output signal; and a fifth delay element having an input and an output, the input being connected to receive the p−3 least significant bits of the output of said third delay element, the output of said fifth delay element providing a fifth delayed output signal;

p−3 additional iterative stages, each iterative stage receiving the output signals from the delay elements of the preceding iterative stage, such that the (p−1)st iterative stage comprises:

a (p−1)st) (p+1)-bit adder having a first input, a second input, a sum output and a carry output, the first input of said (p−1)st adder being connected to receive the output of a (2p−4)th delay element of a (p−2)nd iterative stage, the second input of said (p−1)st adder being connected to receive said binary word −n;

a (p−1)st (p+1)-bit switch having a first input, a second input, a control input and an output, said first input being connected to receive the p least significant bits of the output of said (2p−4)th delay element of said preceding iterative stage, the p most significant bits of the second input of said (p−1st) switch being connected to receive the unsigned sum output of said (p−1)st adder, the control input being connected to receive the carry output of said (p−1)st adder, the least significant bit of each of the first input and the second input of said (p−1)st switch being connected to receive the output of a (2p−3)rd delay element of said preceding iterative stage; and a (2p−2)nd delay element having an input and an output, said output connected to receive the output of said (p−1)st switch, the output of said (2p−2)nd delay element providing a (2p−2)nd delayed output;

a pth (p+1)-bit adder having a first input, a second input, a sum output and a carry output, the first input of said pth adder being connected to receive the (2p−2)nd output of said (2p−2)nd delay element, the second input of said pth adder being connected to receive said binary word −n;

a p-bit pth switch having a first input, a second input, a control input and an output, the first input of said pth switch being connected to receive the p least significant bits of the (2p−1)st delayed output of the (2p−1)st delay element, the second input of said pth switch being connected to receive the unsigned sum output of said pth adder, the control input of said pth switch being connected to receive the carry output of said pth adder;

a (2p−1)st delay element having an input and an output, the input of said (2p−1)st delay element being connected to the output of said pth switch, the output of said (2p−1)st delay element being the demultiplexed second digital output signal;

first through pth inverters, each of said inverters having an input and an output, the inputs of said first through pth inverters being connected to the respective carry outputs of said first through pth adders;

first through pth p-stage shift registers, each having a serial input and an output for each of said p stages, said serial inputs of said first through pth shift registers connected to the respective outputs of said first through pth inverters, said shift registers shifting in response to said clock signal, one stage of each of said first through pth shift registers providing a respective bit of said demultiplexed first digital output signal such that:

the bit with the weight $2^{p-1}$ is provided by the pth stage of the first shift register;

the bit with the weight $2^{p-2}$ is provided by the (p−1)st stage of the second shift register;

the bit with the weight $2^1$ is provided by the second stage of the (p−1)st shift register; and the bit with the weight $2^0$ from the first stage of the pth shift register.

* * * * *